(12) United States Patent  (10) Patent No.: US 11,575,469 B2
Chandrasekher et al.  (45) Date of Patent: Feb. 7, 2023

(54) MULTI-BIT FEEDBACK PROTOCOL SYSTEMS AND METHODS

(71) Applicant: Aira Technologies, Inc., Saratoga, CA (US)

(72) Inventors: Anand Chandrasekher, Saratoga, CA (US); RaviKiran Gopalan, Cupertino, CA (US); Sandeep Kesireddy, San Jose, CA (US); Arman Rahimzamani, San Jose, CA (US)

(73) Assignee: Aira Technologies, Inc., Saratoga, CA (US)

( * ) Notice: Subject to any disclaimer, the term of this patent is extended or adjusted under 35 U.S.C. 154(b) by 0 days.

(21) Appl. No.: 17/560,964

(22) Filed: Dec. 23, 2021

(65) Prior Publication Data

US 2022/0209894 A1  Jun. 30, 2022

Related U.S. Application Data

(63) Continuation-in-part of application No. 17/556,155, filed on Dec. 20, 2021.

(60) Provisional application No. 63/131,268, filed on Dec. 28, 2020.

(51) Int. Cl.
*H04L 1/00* (2006.01)
*H04L 9/00* (2022.01)

(52) U.S. Cl.
CPC .......... *H04L 1/0061* (2013.01); *H04L 1/0041* (2013.01); *H04L 1/0045* (2013.01); *H04L 1/0089* (2013.01)

(58) Field of Classification Search
None
See application file for complete search history.

(56) References Cited

U.S. PATENT DOCUMENTS

| | | | | |
|---|---|---|---|---|
| 5,022,029 A | * | 6/1991 | Guichon | G08C 19/28 714/701 |
| 5,657,325 A | | 8/1997 | Lou | |
| 5,910,182 A | | 6/1999 | Dent | |
| 5,968,197 A | | 10/1999 | Doiron | |
| 6,126,310 A | * | 10/2000 | Osthoff | H04L 1/1819 714/751 |
| 6,418,549 B1 | * | 7/2002 | Ramchandran | H04L 1/0041 714/748 |

(Continued)

FOREIGN PATENT DOCUMENTS

| | | |
|---|---|---|
| CN | 106487610 A | 3/2017 |
| GB | 2493081 A | 1/2013 |

OTHER PUBLICATIONS

Interview Agenda (Year: 2022).*

(Continued)

*Primary Examiner* — Cynthia Britt
*Assistant Examiner* — Dipakkumar B Gandhi
(74) *Attorney, Agent, or Firm* — Carr & Ferrell LLP

(57) ABSTRACT

Multi-bit feedback protocol systems and methods are described herein. A method can include correcting, by a sink, an error in a data packet using a multi-bit feedback protocol, the data packet being transmitted over a wireless link to a sink by a source; determining that the multi-bit feedback protocol has failed; and reverting back to an automatic repeat request protocol when the multi-bit feedback protocol has failed.

21 Claims, 7 Drawing Sheets

(56) References Cited

U.S. PATENT DOCUMENTS

| | | | |
|---|---|---|---|
| 6,505,253 B1* | 1/2003 | Chiu | H04L 1/1832 370/254 |
| 6,523,068 B1 | 2/2003 | Beser et al. | |
| 7,016,658 B2 | 3/2006 | Kim et al. | |
| 7,124,205 B2 | 10/2006 | Craft et al. | |
| 7,447,234 B2 | 11/2008 | Colas et al. | |
| 7,664,883 B2 | 2/2010 | Craft et al. | |
| 7,848,350 B1* | 12/2010 | Inamdar | H04L 69/08 370/464 |
| 7,971,131 B1 | 6/2011 | Ordentilch | |
| 8,223,643 B1 | 7/2012 | Wolfgang | |
| 8,305,963 B1 | 11/2012 | Breau | |
| 8,327,232 B2 | 12/2012 | Budampati et al. | |
| 8,352,830 B1 | 1/2013 | Landschaft et al. | |
| 8,437,267 B2 | 5/2013 | Amir et al. | |
| 8,473,821 B2 | 6/2013 | Taghavi Nasrabadi et al. | |
| 8,693,406 B2 | 4/2014 | Ahmadi | |
| 8,990,663 B2 | 3/2015 | Liu et al. | |
| 10,270,564 B2 | 4/2019 | Djukic et al. | |
| 10,491,569 B1 | 11/2019 | Powell | |
| 10,749,594 B1 | 8/2020 | O'Shea et al. | |
| 11,088,784 B1 | 8/2021 | Gopalan et al. | |
| 11,191,049 B1 | 11/2021 | Chandrasekher et al. | |
| 11,368,250 B1 | 6/2022 | Chandrasekher et al. | |
| 11,368,251 B1 | 6/2022 | Chandrasekher et al. | |
| 2001/0030954 A1* | 10/2001 | Hameleers | H04W 88/16 370/338 |
| 2002/0026523 A1 | 2/2002 | Mallory et al. | |
| 2002/0054608 A1 | 5/2002 | Wan | |
| 2002/0122510 A1 | 9/2002 | Yakhnich et al. | |
| 2003/0215029 A1* | 11/2003 | Limberg | H04N 5/211 375/321 |
| 2004/0049725 A1* | 3/2004 | Golitschek | H04L 1/0003 714/776 |
| 2004/0170120 A1 | 9/2004 | Reunamaki et al. | |
| 2005/0094561 A1* | 5/2005 | Raaf | H04W 88/06 370/235 |
| 2005/0208897 A1 | 9/2005 | Lyons | |
| 2006/0021040 A1 | 1/2006 | Boulanger | |
| 2006/0047862 A1 | 3/2006 | Shearer et al. | |
| 2006/0268996 A1 | 11/2006 | Sethi et al. | |
| 2007/0168197 A1 | 7/2007 | Vasilache | |
| 2008/0002688 A1 | 1/2008 | Kim et al. | |
| 2008/0002790 A1 | 1/2008 | Itoh | |
| 2008/0126824 A1 | 5/2008 | Lee et al. | |
| 2008/0225735 A1* | 9/2008 | Qiu | H04N 19/89 370/252 |
| 2008/0250299 A1 | 10/2008 | Maillet et al. | |
| 2009/0086711 A1 | 4/2009 | Capretta et al. | |
| 2009/0119566 A1* | 5/2009 | Hiromitsu | H03M 13/13 714/752 |
| 2009/0276686 A1 | 11/2009 | Liu et al. | |
| 2010/0037270 A1 | 2/2010 | Bennet | |
| 2010/0103830 A1 | 4/2010 | Salgado et al. | |
| 2010/0165868 A1* | 7/2010 | Gersemsky | H04L 25/45 370/252 |
| 2010/0192175 A1 | 7/2010 | Bachet | |
| 2010/0202416 A1* | 8/2010 | Wilhelmsson | H04W 72/1215 370/336 |
| 2010/0262885 A1 | 10/2010 | Cheng | |
| 2011/0131461 A1 | 6/2011 | Schulz | |
| 2011/0206019 A1 | 8/2011 | Zhai et al. | |
| 2011/0206065 A1 | 8/2011 | Kim et al. | |
| 2011/0216787 A1 | 9/2011 | Ai et al. | |
| 2011/0258519 A1 | 10/2011 | Laevens et al. | |
| 2012/0300642 A1 | 11/2012 | Abel et al. | |
| 2013/0018889 A1 | 1/2013 | Jagmohan | |
| 2013/0132786 A1 | 5/2013 | Tanigawa et al. | |
| 2013/0223203 A1 | 8/2013 | Bai | |
| 2013/0250179 A1 | 9/2013 | Lida | |
| 2013/0339036 A1 | 12/2013 | Baeckstroem et al. | |
| 2014/0140342 A1 | 5/2014 | Narad | |
| 2014/0241309 A1 | 8/2014 | Hilton et al. | |
| 2015/0009902 A1 | 1/2015 | Emmanuel | |
| 2016/0006842 A1 | 1/2016 | Tahir | |
| 2016/0062954 A1 | 3/2016 | Ruff | |
| 2016/0254881 A1 | 9/2016 | Meylan | |
| 2017/0006616 A1 | 1/2017 | Singh et al. | |
| 2017/0012799 A1 | 1/2017 | Jiang | |
| 2017/0269876 A1 | 9/2017 | Mukhopadhyay et al. | |
| 2018/0013808 A1 | 1/2018 | Petry et al. | |
| 2018/0048567 A1* | 2/2018 | Ignatchenko | H04L 45/741 |
| 2018/0101957 A1 | 4/2018 | Talathi | |
| 2018/0167171 A1* | 6/2018 | Wu | H04L 1/1858 |
| 2018/0267850 A1 | 9/2018 | Froelich et al. | |
| 2018/0288198 A1 | 10/2018 | Pope et al. | |
| 2018/0314985 A1 | 11/2018 | O'Shea | |
| 2018/0359811 A1 | 12/2018 | Verzun et al. | |
| 2019/0028237 A1 | 1/2019 | Pan et al. | |
| 2019/0037052 A1 | 1/2019 | Deshpande | |
| 2019/0097680 A1 | 3/2019 | O'Brien | |
| 2019/0097914 A1 | 3/2019 | Zhong et al. | |
| 2019/0392266 A1 | 12/2019 | Zhong et al. | |
| 2019/0393903 A1 | 12/2019 | Mandt et al. | |
| 2020/0128279 A1 | 4/2020 | Han et al. | |
| 2020/0177418 A1 | 6/2020 | Hoydis et al. | |
| 2020/0213152 A1 | 7/2020 | Choquette et al. | |
| 2020/0320371 A1 | 10/2020 | Baker | |
| 2020/0383169 A1 | 12/2020 | Takahashi et al. | |
| 2021/0014939 A1 | 1/2021 | Verzun et al. | |
| 2021/0034846 A1 | 2/2021 | Ko et al. | |
| 2021/0056058 A1 | 2/2021 | Lee et al. | |
| 2021/0120440 A1 | 4/2021 | Reimann et al. | |
| 2021/0319286 A1 | 10/2021 | Gunduz | |
| 2021/0392033 A1* | 12/2021 | Haartsen | H04L 43/0847 |
| 2022/0045696 A1 | 2/2022 | Boussard | |
| 2022/0114436 A1 | 4/2022 | Gopalan et al. | |
| 2022/0132367 A1 | 4/2022 | Liu et al. | |
| 2022/0209893 A1 | 6/2022 | Chandrasekher et al. | |
| 2022/0209895 A1 | 6/2022 | Chandrasekher et al. | |
| 2022/0209897 A1 | 6/2022 | Jiang et al. | |
| 2022/0311542 A1 | 9/2022 | Chandrasekher et al. | |
| 2022/0321260 A1 | 10/2022 | Chandrasekher et al. | |

OTHER PUBLICATIONS

Kim et al., "Deepcode: Feedback Codes via Deep Learning," [online] Jul. 2, 2013 [retrieved on Apr. 17, 2020], Retrieved from the Internet: < URL:https://arxiv.org/abs/1807.00801v1>, 24 pages.

Gopalan et al., "Systems and Methods for Artificial Intelligence Discovered Codes", U.S. Appl. No. 17/069,794, filed Oct. 13, 2020, Specification, Claims, Abstract, and Drawings, 43 pages.

Goutay et al., "Deep reinforcement learning autoencoder with noisy feedback." 2019 International Symposium on Modeling and Optimization in Mobile, Ad Hoc, and Wireless Networks (WiOPT). IEEE, Jun. 24, 2019, 6 pages.

Yamamoto et al., "Application of Yamamoto-Itoh coding scheme to discrete memoryless broadcast channels." 2017 IEEE International Symposium on Information Theory (ISIT). IEEE, 2017, 5 pages.

Aoudia et al., "End-to-end learning of communications systems without a channel model." 2018 52nd Asilomar Conference on Signals, Systems, and Computers. IEEE, Dec. 5, 2018, 6 pages.

Duman et al., "On optimal power allocation for turbo codes." Proceedings of IEEE International Symposium on Information Theory, IEEE, Jun. 29-Jul. 4, 1997, 1 page.

Arvinte et al., "Deep log-likelihood ratio quantization." 2019 27th European Signal Processing Conference (EUSIPCO). IEEE, 2019, 5 pages.

"International Search Report" and "Written Opinion", Patent Cooperation Treaty Application No. PCT/US2021/054265, dated Nov. 24, 2021, 24 pages.

"International Search Report" and "Written Opinion", Patent Cooperation Treaty Application PCT/US2021/063356, dated Jan. 14, 2022, 9 pages.

"International Search Report" and "Written Opinion", Patent Cooperation Treaty Application No. PCT/US2021/061902, dated Jan. 24, 2022, 11 pages.

Henze, Martin, "A Machine-Learning Packet-Classification Tool for Processing Corrupted Packets on End Hosts", Diploma Thesis,

(56) References Cited

OTHER PUBLICATIONS

Chair of Communication and Distributed Systems, RWTH Aachen University, Mar. 2011, 103 pages.

"International Search Report" and "Written Opinion", Patent Cooperation Treaty Application No. PCT/US2021/06617, dated Mar. 11, 2022, 12 pages.

Kötter et al., "Coding for Errors and Erasures in Random Network Coding", IEEE Transactions on Information Theory 54.8; 3579-3591. Mar. 25, 2008; Retrieved on Feb. 19, 2022 (Feb. 19, 2022) from <https://arxiv.org/pdf/cs/0703061.pdf> entire document; 30 pages.

Grcar, Joseph, "How ordinary elimination became Gaussian elimination", Historia Mathematica vol. 38 Issue 2, May 2011; Available online Sep. 28, 2010; pp. 163-218.

"International Search Report" and "Written Opinion", Patent Cooperation Treaty Application No. PCT/US2021/064735, dated Mar. 17, 2022, 11 pages.

\* cited by examiner

MULTI-BIT FEEDBACK PROTOCOL SYSTEMS AND METHODS

CROSS-REFERENCE TO RELATED APPLICATIONS

This application is a continuation-in-part of and claims the benefit and priority of U.S. application Ser. No. 17/556,155, filed on Dec. 20, 2021, which claims the benefit and priority of U.S. Provisional Application Ser. No. 63/131,268, filed on Dec. 28, 2020, each of which are hereby incorporated by reference herein, including all references and appendices cited therein, for all purposes as if fully set forth herein.

FIELD OF THE PRESENT TECHNOLOGY

The present disclosure pertains to the technical field of wireless communications, and more specifically, but not by way of limitation, to systems and methods that improve wireless communications using multi-bit feedback protocols.

SUMMARY

According to some embodiments, the present disclosure is directed to a method comprising correcting, by a sink, an error in a data packet using a multi-bit feedback protocol, the data packet being transmitted over a wireless link to the sink by a source; determining that the multi-bit feedback protocol has failed; and reverting back to an automatic repeat request protocol when the multi-bit feedback protocol has failed.

According to some embodiments, the present disclosure is directed to a device comprising a processor; and a memory for storing executable instructions, the processor executing the instructions to: correct an error in a data packet using a multi-bit feedback protocol, the data packet being transmitted over a wireless link to the sink by a source; determine that the multi-bit feedback protocol has failed; and revert back to an automatic repeat request protocol when the multi-bit feedback protocol has failed.

According to some embodiments, the present disclosure is directed to a method comprising correcting, by a sink, an error in a data packet using a multi-bit feedback protocol, the data packet being transmitted over a wireless link to the sink by a source; correcting the data packet using a correction algorithm, the correction algorithm being executed over a stored data packet; determining any of: expiration of a timer as additional correction packets are transmitted to the sink; and/or when additional correction packets that are transmitted by the source are unresolvable; and retransmitting the base transmission when the additional correction packets are unresolvable or the timer has expired; determining that the multi-bit feedback protocol has failed; and reverting back to an automatic repeat request protocol when the multi-bit feedback protocol has failed.

According to some embodiments, the present disclosure is directed to a method comprising reverting from a multi-bit feedback protocol to an automatic repeat request protocol upon failure of the multi-bit feedback protocol and when any one or more occurs: a data packet is confused as a correction transmission when the data packet is a base transmission; a correction phase for correcting an error in the data packet introduces additional errors; and/or a divergence in a correction algorithm occurs.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Overview

Figure 1:
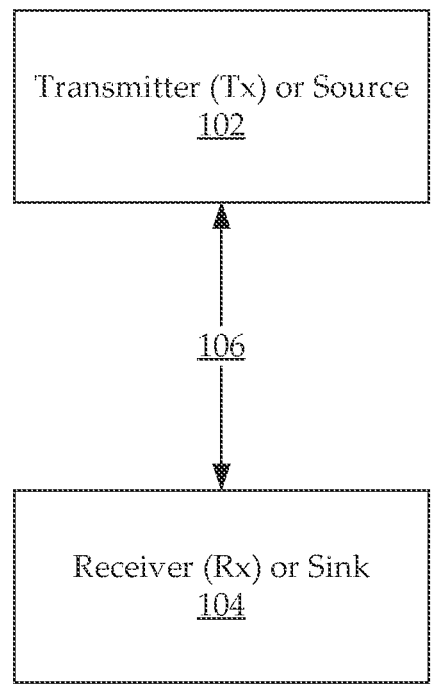
FIG. 1 is a schematic diagram of an example wireless environment where aspects of the present disclosure can be practiced.

Wireless protocols include a set of rules or agreed-upon guidelines for communication. These rules are used in the design of hardware and software that governs data transmission over the air. One example wireless protocol includes BLUETOOTH, although the present disclosure is not limited to application to BLUETOOTH protocol.

When a device is transmitting data packets over a network according to a protocol, errors may be introduced due to attenuation in the wireless channel. One method of identifying and correcting these errors involves the use of a cyclic redundancy check (CRC). CRC is a short error-detecting code to detect accidental payload changes. CRC is computed on the payload at the transmitter side (Tx), and attached to the end of the payload. Both payload and CRC are transmitted to the receiver (Rx). At the receiver, the received CRC is compared to the CRC computed by the received payload. If the received CRC equals the computed CRC, the CRC passes. If the received CRC doesn't match the computed CRC, the CRC fails.

When CRC passes, it is of a very high probability that the packet is error-free, so the Rx can transmit an acknowledgment (ACK) to the Tx, to inform the Tx to continue to transmit the next packet. When CRC fails, it is of a very high probability that the packet is contaminated, so a no-acknowledgment (NACK) is triggered. When the Rx asks for retransmission using the NACK. In sum, when the Tx receives ACK, it will transmit the next packet; when the Tx receives NACK, it will re-transmit the packet. The transmission of ACK or NACK messages to a transmitter is a simple form of feedback that includes 1-bit of data, referred to as single bit feedback protocol.

While these methods can be used, there are technical problems that arise with their use. BLUETOOTH protocol, currently, implements a single bit feedback system. The feedback is one-bit information that only indicates whether a packet is received correctly or not. The feedback is exactly one-bit information (timeout is also a bit of information or packet not received correctly). Overall, with single-bit information feedback from Rx to Tx, the Tx cannot do anything other than re-transmit the entire packet. When the received packet has only a few bits error, it is not efficient to retransmit the whole packet again.

In traditional BLUETOOTH systems, any error in the received packet results in discarding the entire packet and there is no further processing. For protocols that implement feedback schemes, a data packet that is determined to have errors can be corrected or otherwise processed. In some instances, the header of the data packet includes a redundant protocol byte that indicates if the error packet received needs to be processed as a base transmission data packet or a correction packet. If the received packet is a base transmission, the packet is retained for correction in future retransmissions. If the received packet is a correction packet, the packet can be decoded and a correction algorithm can be executed to process the base packet that was previously stored.

Processing of the received packets in a system that implements a feedback protocol has the following issues. The base packet, when retransmitted, can be confused as a correction packet. Another issue can arise during a correction phase of the algorithm, where additional errors can be introduced due to retransmissions in the correction phase. Another issue may arise when there is a divergence in the correction algorithm and the Tx decides that there is no further correction needed when in actuality the packet received by the Rx has errors.

In some instances, a multi-bit feedback protocol is built as an extension over the current BLUETOOTH automatic repeat request (ARQ) protocol. In these instances, the Rx sends an ACK only when a base payload is successfully received. Correction packets are exchanged with a NACK at the baseband and are processed by the multi-bit feedback system. Any acquisition loss results in retransmission in accordance with the standard BLUETOOTH protocol and the multi-bit feedback system handles duplicate correction packets.

If the feedback link completely breaks down for some reason, the system falls back to BLUETOOTH ARQ system due to retransmissions triggered by the source. Any flush timeouts in the system may result in a reset of the multi-bit feedback system. If a reset occurs, the Tx and Rx move on to the next packet.

Example Embodiments

Turning now to the drawings, and to FIG. 1, which is a schematic diagram of an example wireless environment. The environment may include a transmitter 102 (also known as a source), a receiver 104 (also known as a sink), and a wireless link 106. In some instances, the transmitter 102 and receiver 104 are configured to use a BLUETOOTH protocol to communicate with one another over the wireless link 106.

That is, each of the transmitter 102 and the receiver 104 are configured to use BLUETOOTH protocols, and specifically, the multi-bit feedback protocols disclosed herein. That is, rather than using single-bit feedback as is known in the BLUETOOTH protocol, the transmitter 102 and the receiver 104 can be configured to use a multi-bit feedback protocol which is built as an extension over the current BLUETOOTH ARQ protocol. Multi-bit feedback involves the generation and transmission of error bits identified between received and transmitted data packets. That is, when errors are identified in a received data packet, error positions corresponding to those errors can be transmitted rather than a simple ACK/NACK. The error positions can be transmitted as an index in some embodiments. A device can use the error positions to correct the errors identified in the received data packet. The method can include a step of receiving, by the transmitter encoder, a received packet that comprises errors. The method includes an iterative or cyclic error correction process that can involve one or more rounds of error correction. A first round of error correction can comprise a step of generating an index of the error correction, the index comprising error positions for the errors. The method also includes a step of transmitting the index on the forward link. The method can include a step of generating a corrected packet using the index. This can include deindexing the index and correcting the error bits. Again, the index indicates the location of bits that require flipping. The receiver decoder can flip bits in the received packet according to the error positions in the index to generate the corrected packet. In some embodiments, the feedback system can automatically revert from a multi-bit feedback protocol to an automatic repeat request (ARQ) protocol upon failure of the multi-bit feedback protocol.

Both the transmitter 102 and the receiver 104 each comprise a processor and memory. The memory stores instructions that can be executed by the processor to perform the various methods disclosed herein. In some embodiments, both the transmitter 102 and receiver 104 are each configured to perform improved multi-bit feedback methods as disclosed herein.

Figure 2A:
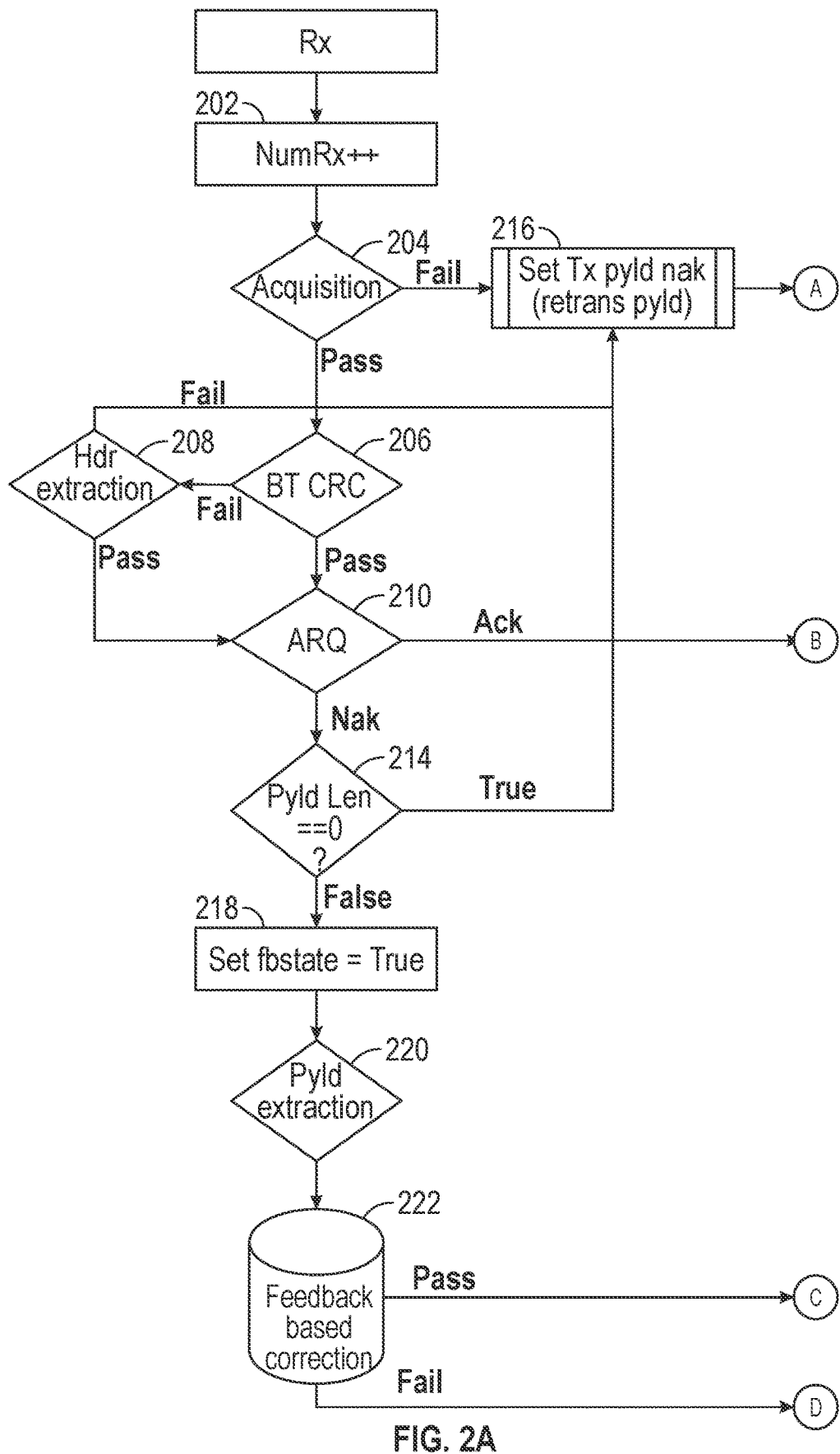
FIGS. 2A and 2B depict a flowchart of an example method of a multi-bit feedback protocol.
Figure 2B:
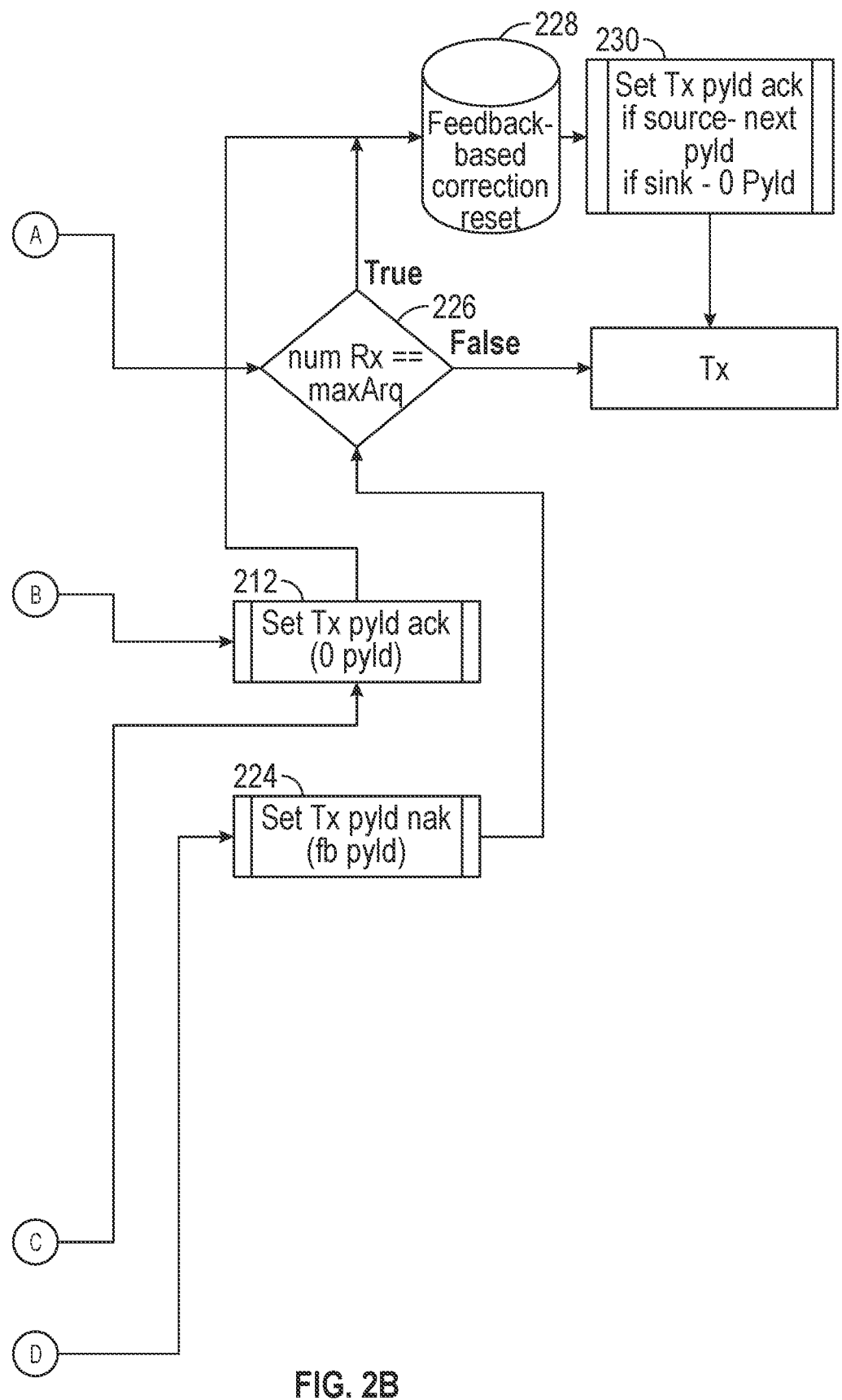

FIGS. 2A and 2B collectively illustrate an example method of the present disclosure performed within a multi-bit feedback system. The method can include a step 202 where a receiver Rx sets a data packet counter numRx. A determination is made in step 204 if a data packet is successfully acquired or not. If the data packet is successfully acquired, the method moves to step 206 where a CRC is evaluated. In this step, a determination is made as to whether the received data packet that was acquired in step 204 has any errors. If the data packet has errors, a protocol header of the data packet can be extracted in step 208. This step can also involve comparing the protocol header of the data packet to a feedback protocol byte included in the data packet to prevent the data packet from being confused as the correction transmission (e.g., correction packet).

If the feedback protocol byte is verified, the method can move to step 210. It will be understood that step 210 is reached when the data packet successfully passes the CRC in step 206. Step 210 includes executing ARQ for the data packet. If the ARQ passes, the method moves to step 212 where an acknowledgment (ACK) is generated. If the ARQ fails, the method moves to step 214 where a payload length analysis occurs. If the determination in step 214 indicates that the payload is empty (e.g., payload length is zero), the method can move to step 216 where a NACK message is generated and retransmission of the base transmission (e.g., originally transmitted payload) is requested. It is noteworthy to mention that a NACK is generated in step 214 when the header extraction step 208 fails, and/or when the payload is empty. In either of these instances, a retransmission of the base transmission is requested.

If the determination in step 214 indicates that the payload is not empty (e.g., payload length is NOT zero), the method can move to step 218 where the feedback state is set to true, and a step 220 where the payload is extracted. In step 222 a Feedback based correction process is executed. If the Feedback based correction step passes, the method can revert to step 212 where an acknowledgment (ACK) is generated. If, on the other hand, the Feedback based correction step fails, the method can move to step 224 where a NACK is generated. However, this NACK is associated with a request to transmit a correction packet/transmission, rather than the base packet/transmission.

When retransmission of the base packet has been requested in step 216, the method can move to step 226 where there is a determination made as to whether the request for retransmission of the base packet meets or exceeds an ARQ threshold. The method can also move to step 226 from step 224. As will be discussed herein, the ARQ threshold can be based on a timer or a count of messages. For example, the transmitter Tx may have been asked to retransmit the base packet a threshold number of times or has been asked to send a threshold number of correction packets. When this limit is encountered, the method can include a step 228 of resetting the NPP Turbo (e.g., flushing the source) and indicating to the transmitter Tx that it should move on to transmit a next base packet (e.g., a new data packet). Thus, when a multi-bit feedback process becomes unresolvable, rather than getting stuck in a never-ending loop, the method allows for a break in the retransmission of packets. The transmitter Tx moves on to transmitting a new packet when a prior packet is unresolved. In step 230, if the threshold has not been met, the transmitter is allowed to transmit either a base packet or a correction packet, depending on the circumstances.

As noted above, the multi-bit feedback protocols disclosed herein are built as an extension over the current BLUETOOTH ARQ protocol. In some embodiments, a receiver Rx transmits an ACK only when the base payload is successfully received. That is, the ACK is only transmitted when a data packet comprising a payload is (1) successfully received/acquired; (2) the payload passes a CRC check; and (3) the payload of the data packet is successfully extracted.

In the event that an error is detected in payload and a correction is requested, any correction packet is exchanged with a NACK at the baseband (e.g., transmitter Tx) and are processed using the multi-bit feedback protocols disclosed herein. In some embodiments, any acquisition loss results in a retransmission of the base packet/transmission in accordance with the BLUETOOTH protocol. The multi-bit feedback protocols are configured to handle duplicate correction packets, as will be discussed in greater detail herein.

In the event a feedback link completely breaks down for some reason, the multi-bit feedback protocol can fall back to ARQ due to retransmissions triggered by the Tx. That is, when a retransmission threshold is reached, the Tx can be configured to flush or reset and subsequently begin transmitting a new base packet/transmission. Similarly, any flush timeouts can result in a reset of the multi-bit feedback protocol. That is, the source and sink move on to the next base packet.

As noted, the multi-bit feedback protocols disclosed herein can be used to revert to ARQ in the middle of a feedback mode. In instances where a base packet is confused as a correction packet, a feedback protocol byte is added within the payload that indicates if the payload is either a base transmission or a correction packet. The feedback protocol byte is heavily coded and the Bluetooth protocol header can be used to validate the feedback protocol byte when needed.

In addition to using the feedback protocol byte verification above, additional verifications or confirmations can be used. For example, a received transmission can be compared to a previous transmission that is stored. This will help avoid confusing the base retransmissions as correction packets. In one example, if a base packet retransmission is requested due to a failed attempt to acquire the base packet. The Rx can request retransmission of this base packet. It is advantageous to be able to differentiate a retransmitted base packet from a correction packet.

A correction algorithm used in a correction phase may introduce additional errors due to retransmissions during the correction phase. In the correction phase, a correction payload is checked against one or more previously received correction payloads. Comparing correction payload ensures that already corrected bits are not re-corrected which would lead to a new error, or introduce additional errors into the base payload.

Another example issue may arise if there is a divergence in the correction algorithm and the source (Tx) decides that there is no further correction needed; however, the packet at the Rx has errors. In the correction phase, when there is a divergence between the source Tx and sink Rx in the base payloads, the multi-bit feedback protocol could enter an infinite loop where the source and sink cannot agree on a payload. This can be identified by either having a time out (expiration of a timer) or by introducing short correction packets that cannot be resolved. Once identified, the feedback system is flushed and restarted. The base payload can be retransmitted again without acknowledging the previous base packet.

Figure 3:
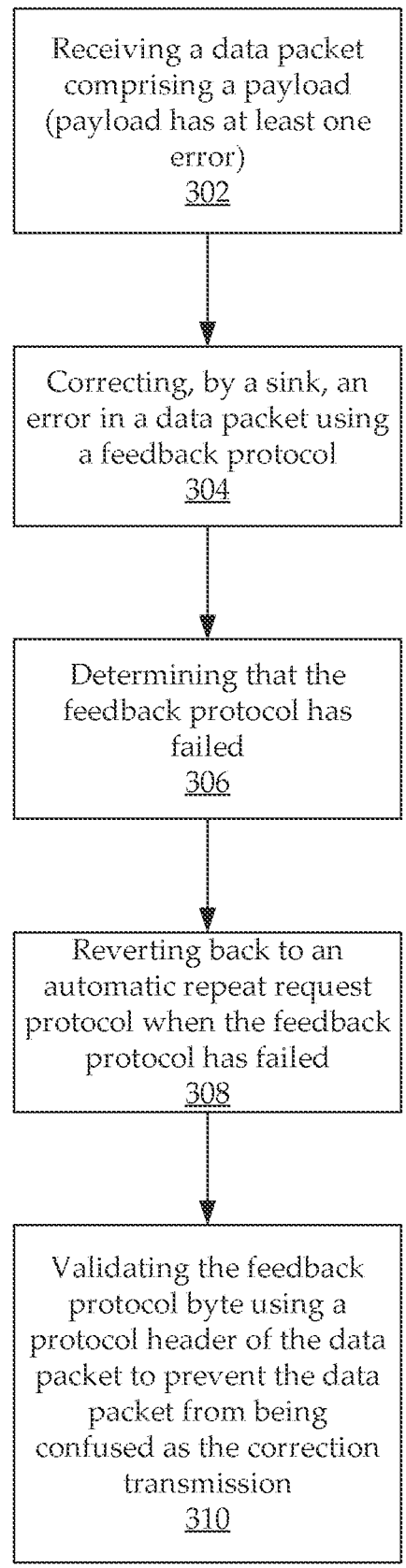
FIG. 3 is a flowchart of another example method.

FIG. 3 is a flowchart of an example method of the present disclosure. In general, the method involves automatic reversion to ARQ during a multi-bit feedback protocol. The method can begin with a step 302 of receiving a data packet comprising a payload. The payload has a feedback protocol byte that indicates that the payload is a base transmission rather than a correction transmission. In this particular method, it can be assumed that the payload has at least one error. In some instances, the data packet is stored when the data packet is determined to be a base transmission.

The method can include a step 304 of correcting, by a sink, an error in a data packet using a feedback protocol. As noted above, the data packet is transmitted over a wireless link to the sink by a source. The method can also include a step 306 of determining that the multi-bit feedback protocol has failed. The multi-bit feedback protocol can fail for any number of reasons such as when the source and sink cannot align on the payload being error-free or not. The method can include a step 308 of reverting back to an automatic repeat request protocol when the multi-bit feedback protocol has failed. Thus, any time an intractable error is identified during a multi-bit feedback protocol, the system can revert automatically to ARQ.

In one embodiment, the method includes a step 310 of validating the feedback protocol byte using a protocol header of the data packet to prevent the data packet from being confused as the correction transmission.

Figure 4:
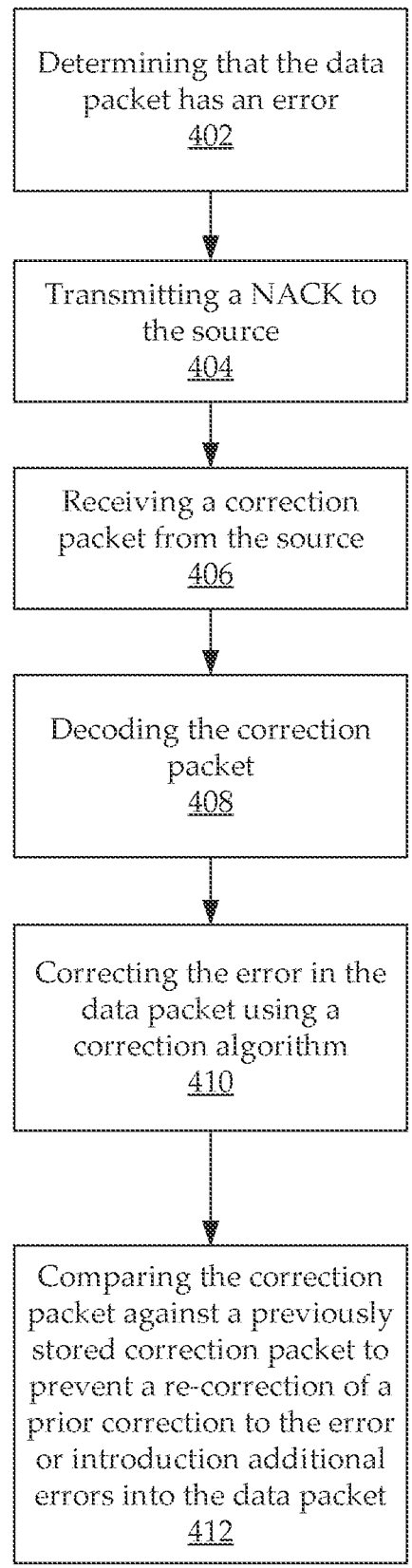
FIG. 4 is a flowchart of an example multi-bit feedback protocol method.

FIG. 4 is a flowchart of an example multi-bit feedback protocol method. In one embodiment, the method includes a step 402 of determining that the data packet has an error. As noted above, the error can be detected using CRC, as an example. When the error is detected, the method can include a step 404 of transmitting a no-acknowledgment to the source. The method can include a step 406 of receiving a correction packet from the source, as well as a step 408 of decoding the correction packet. Once decoded, the method includes a step 410 of correcting the error in the data packet using a correction algorithm. It will be understood that the correction algorithm can be executed over a stored data packet.

In some embodiments, the method can include a step 412 of comparing the correction packet against a previously stored correction packet to prevent a re-correction of a prior correction to the error or introduction additional errors into the data packet.

Figure 5:
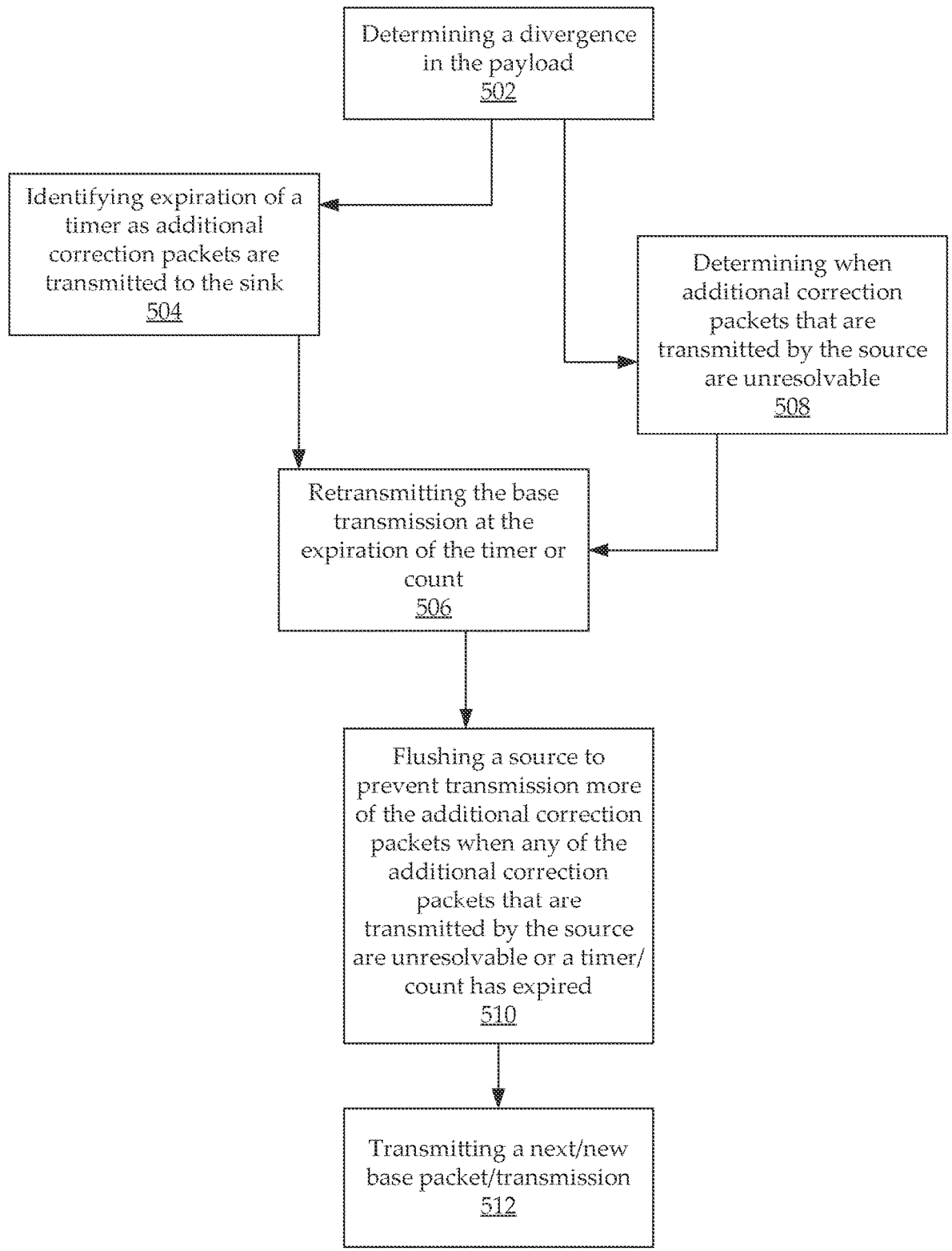
FIG. 5 is a flowchart of an example method for dealing with divergences.

FIG. 5 is a flowchart of another example method involving determining divergences payloads of data packets and correcting for the same. The method can include a step 502 of determining a divergence in the payload. This divergence is due to an error in a correction algorithm used to correct the error in the data packet. When divergence is detected, the method can identify additional multi-bit feedback protocol behaviors and take action. For example, the method can include a step 504 of identifying the expiration of a timer as additional correction packets are transmitted to the sink. In this example, correction packets can be resent as long as the timer has not expired. It will be understood that rather than using a timer, a message count can also be used. For example, the Tx may be allowed to retransmit additional correction packets before hitting a stop. When a timer or count is used, the method can include a step 506 of retransmitting the base transmission at the expiration of the timer or count.

In another embodiment, after the divergence has been determined in step 502, the method can include a step 508 of determining when additional correction packets that are transmitted by the source are unresolvable. These correction packets may be unresolvable because they are intentionally short. That is, the Tx is now introducing and transmitting short correction packets that cannot be resolved in order to break the multi-bit feedback protocol loop. The method can then move to step 506 of retransmitting the base transmission when the additional correction packets are unresolvable.

The method can include a step 510 of flushing a source to prevent transmission of more of the additional correction packets when any of the additional correction packets that are transmitted by the source are unresolvable or a timer/count has expired. Once flushed, the source can transmit a new base packet/transmission in step 512.

In general, the methods and systems herein can revert from a multi-bit feedback protocol to an automatic repeat request protocol upon failure of the feedback protocol and when any one or more occurs: (1) a data packet is confused as a correction transmission when the data packet is a base transmission; (2) a correction phase for correcting an error in the data packet introduces additional errors; and/or (3) a divergence in a correction algorithm occurs during the multi-bit feedback protocol being implemented.

Figure 6:
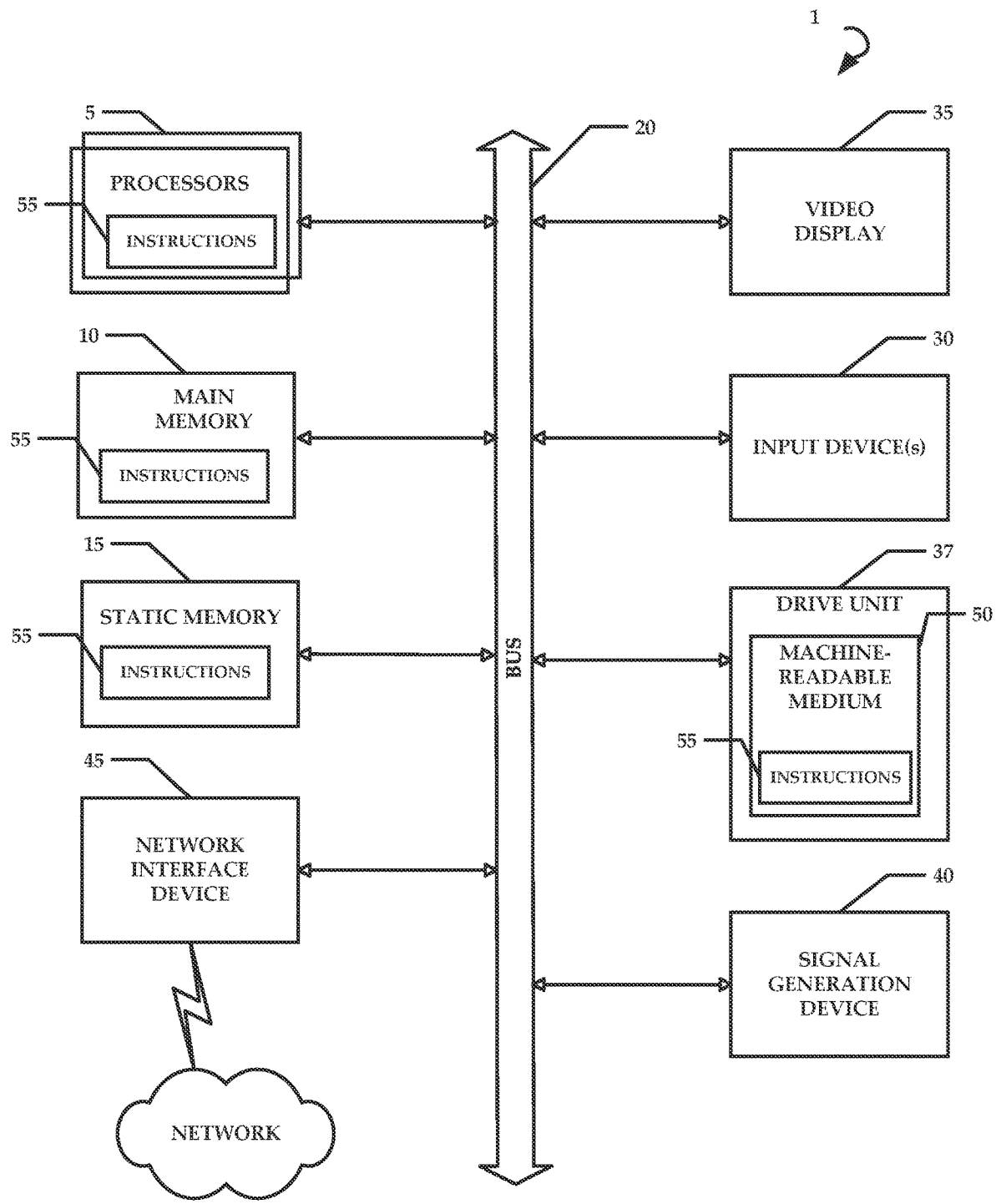
FIG. 6 is a schematic diagram of an exemplary computer system that is used to implement embodiments according to the present technology.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be an Internet-of-Things device or system, a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are well known in the art. Thus, the computer system 1 can be an Internet-of-Things device or system, a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications, as well as wireless communications (both short-range and long-range). Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method comprising:
correcting, by a sink, an error in a data packet using a multi-bit feedback protocol, the multi-bit feedback protocol involving generation and transmission of error bits identified in the data packet, the data packet being transmitted over a wireless link to the sink by a source, the correcting further comprising:
generating and transmitting an index of an error correction, the index comprising positions of the error bits in the data packet that require flipping; and
flipping the error bits in the data packet according to the positions in the index;
determining that the multi-bit feedback protocol has failed; and
reverting back to an automatic repeat request protocol when the multi-bit feedback protocol has failed.

2. The method according to claim 1, further comprising receiving the data packet comprising a payload having a feedback protocol byte, the feedback protocol byte indicating that the payload is a base transmission rather than a correction transmission.

3. The method according to claim 2, further comprising validating the feedback protocol byte using a protocol header of the data packet to prevent the data packet from being confused as the correction transmission.

4. The method according to claim 3, wherein the multi-bit feedback protocol comprises:
determining that the data packet has the error;
transmitting a no-acknowledgment to the source when the error is determined;
receiving a correction packet from the source;
decoding the correction packet; and
correcting the error in the data packet using a correction algorithm, the correction algorithm being executed over a stored data packet.

5. The method according to claim 4, further comprising comparing the correction packet against a previously stored correction packet to prevent a re-correction of a prior correction to the error or introduction additional errors into the data packet.

6. The method according to claim 4, further comprising:
determining a divergence in the payload, which is due to an error in a correction algorithm used to correct the error in the data packet;
identifying expiration of a timer as additional correction packets are transmitted to the sink; and
retransmitting the base transmission at the expiration of the timer.

7. The method according to claim 4, further comprising:
determining a divergence in the payload, which is due to an error in a correction algorithm used to correct the error in the data packet;
determining when additional correction packets that are transmitted by the source are unresolvable; and
retransmitting the base transmission when the additional correction packets are unresolvable.

8. The method according to claim 7, further comprising flushing the source to prevent transmission more of the additional correction packets when any of the additional correction packets that are transmitted by the source are unresolvable.

9. The method according to claim 1, further comprising retaining the data packet as a stored data packet when the data packet is determined to be a base transmission.

10. The method of claim 1, wherein the data packet is stored when the data packet is determined to be a base transmission.

11. A device comprising:
a processor; and
a memory for storing executable instructions, the processor executing the instructions to:
correct, by a sink, an error in a data packet using a multi-bit feedback protocol, the multi-bit feedback protocol involving generation and transmission of error bits identified in the data packet, the data packet being transmitted over a wireless link to the sink by a source, the correcting further comprising:
generating and transmitting an index of an error correction, the index comprising positions of the error bits in the data packet that require flipping; and
flipping the error bits in the data packet according to the positions in the index;
determine that the multi-bit feedback protocol has failed; and
revert back to an automatic repeat request protocol when the multi-bit feedback protocol has failed.

12. The device according to claim 11, wherein the processor is configured to receive the data packet comprising a payload having a feedback protocol byte, the feedback protocol byte indicating that the payload is a base transmission rather than a correction transmission.

13. The device according to claim 12, wherein the processor is configured to validate the feedback protocol byte using a protocol header of the data packet to prevent the data packet from being confused as the correction transmission.

14. The device according to claim 13, wherein the multi-bit feedback protocol comprises:
determining that the data packet has the error;
transmitting a no-acknowledgment to the source when the error is determined;
receiving a correction packet from the source;
decoding the correction packet; and
correcting the error in the data packet using a correction algorithm, the correction algorithm being executed over a stored data packet.

15. The device according to claim 14, further comprising comparing the correction packet against a previously stored correction packet to prevent a re-correction of a prior correction to the error or introduction of additional errors into the data packet.

16. The device according to claim 15, wherein the processor is configured to:
determine a divergence in the payload, which is due to an error in a correction algorithm used to correct the error in the data packet;
identify expiration of a timer as additional correction packets are transmitted to the sink; and
retransmit the base transmission at the expiration of the timer.

17. The device according to claim 15, wherein the processor is configured to:

determine a divergence in the payload, which is due to an error in a correction algorithm used to correct the error in the data packet;

determine when additional correction packets that are transmitted by the source are unresolvable; and retransmit the base transmission when the additional correction packets are unresolvable.

18. The device according to claim 17, wherein the source is configured to flush to prevent transmission more of the additional correction packets when any of the additional correction packets that are transmitted by the source are unresolvable.

19. The device according to claim 18, wherein the processor is configured to retain the data packet as a stored data packet when the data packet is determined to be the base transmission.

20. A method comprising: correcting, by a sink, an error in a data packet using a multi-bit feedback protocol, the multi-bit feedback protocol involving generation and transmission of error bits identified in the data packet, the data packet being transmitted over a wireless link to the sink by a source, the correcting further comprising: generating and transmitting an index of an error correction, the index comprising positions of the error bits in the data packet that require flipping; and flipping the error bits in the data packet according to the positions in the index; correcting the data packet using a correction algorithm, the correction algorithm being executed over a stored data packet; determining any of: expiration of a timer as additional correction packets are transmitted to the sink; and when additional correction packets that are transmitted by the source are unresolvable; and retransmitting a base transmission when the additional correction packets are unresolvable or the timer has expired; determining that the multi-bit feedback protocol has failed; and reverting back to an automatic repeat request protocol when the multi-bit feedback protocol has failed.

21. A method comprising: correcting, by a sink, an error in a data packet using a multi-bit feedback protocol, the multi-bit feedback protocol involving generation and transmission of error bits identified in the data packet, the data packet being transmitted over a wireless link to the sink by a source, the correcting further comprising: generating and transmitting an index of an error correction, the index comprising positions of the error bits in the data packet that require flipping; and flipping the error bits in the data packet according to the positions in the index; reverting from the multi-bit feedback protocol to an automatic repeat request protocol upon failure of the multi-bit feedback protocol and when at least one of the following occurs: the data packet is confused as a correction transmission when the data packet is a base transmission; a correction phase for correcting an error in the data packet introduces additional errors; and a divergence in a correction algorithm occurs.

* * * * *

UNITED STATES PATENT AND TRADEMARK OFFICE
CERTIFICATE OF CORRECTION

PATENT NO. : 11,575,469 B2
APPLICATION NO. : 17/560964
DATED : February 7, 2023
INVENTOR(S) : Anand Chandrasekher et al.

It is certified that error appears in the above-identified patent and that said Letters Patent is hereby corrected as shown below:

In the Claims

In Column 11, Line 50, regarding Claim 5, the phrase "introduction additional errors" should read "introduction of additional errors".

In Column 11, Line 54, regarding Claim 6, the phrase "a correction algorithm" should read "the correction algorithm".

In Column 11, Line 62, regarding Claim 7, the phrase "a correction algorithm" should read "the correction algorithm".

In Column 12, Line 2, regarding Claim 8, the phrase "transmission more" should read "transmission of more".

In Column 12, Lines 10-11, regarding Claim 10, the phrase "a base transmission" should read "the base transmission".

In Column 12, Lines 14-15, regarding Claim 11, the phrase "a memory for storing executable instructions, the processor executing the instructions to:" should read "a memory communicatively coupled to the processor, the memory storing executable instructions by the processor to perform a method comprising:".

In Column 12, Line 16, regarding Claim 11, the word "correct" should read "correcting".

In Column 12, Line 27, regarding Claim 11, the word "determine" should read "determining".

In Column 12, Line 29, regarding Claim 11, the word "revert" should read "reverting".

In Column 12, Lines 31-32, regarding Claim 12, the phrase "the processor is configured to receive" should read "the method further comprises receiving".

Signed and Sealed this
Thirteenth Day of June, 2023

Katherine Kelly Vidal
*Director of the United States Patent and Trademark Office*

CERTIFICATE OF CORRECTION (continued)
U.S. Pat. No. 11,575,469 B2

In Column 12, Lines 36-37, regarding Claim 13, the phrase "the processor is configured to validate" should read "the method further comprises validating".

In Column 12, Lines 52-53, regarding Claim 15, the phrase "further comprising" should read "wherein the method further comprises".

In Column 12, Lines 57-58, regarding Claim 16, the phrase "The device according to claim 15, wherein the processor is configured to:" should read "The device according to claim 14, wherein the method further comprises:".

In Column 12, Line 59, regarding Claim 16, the word "determine" should read "determining".

In Column 12, Line 60, regarding Claim 16, the phrase "a correction algorithm" should read "the correction algorithm".

In Column 12, Line 62, regarding Claim 16, the word "identify" should read "identifying".

In Column 12, Line 64, regarding Claim 16, the word "retransmit" should read "retransmitting".

In Column 12, Lines 66-67, regarding Claim 17, the phrase "The device according to claim 15, wherein the processor is configured to:" should read "The device according to claim 14, wherein the method further comprises:".

In Column 13, Line 1, regarding Claim 17, the word "determine" should read "determining".

In Column 13, Line 2, regarding Claim 17, the phrase "a correction algorithm" should read "the correction algorithm".

In Column 13, Line 4, regarding Claim 17, the word "determine" should read "determining".

In Column 13, Line 6, regarding Claim 17, the word "retransmit" should read "retransmitting".

In Column 13, Line 9, regarding Claim 18, the phrase "transmission more" should read "transmission of more".

In Column 13, Lines 13-14, regarding Claim 19, the phrase "The device according to claim 18, wherein the processor is configured to retain" should read "The device according to claim 11, wherein the method further comprises retaining".

In Column 13, Lines 15-16, regarding Claim 19, the phrase "the base transmission" should read "a base transmission".

In Column 14, Line 5, regarding Claim 20, the phrase "and retransmitting" should read "retransmitting".